Patented Mar. 20, 1934

1,952,041

UNITED STATES PATENT OFFICE

1,952,041

RUBBER GOODS AND METHOD OF MANUFACTURING THE SAME

Edward Arthur Murphy, Erdington, Birmingham, and Douglas Frank Twiss, Wylde Green, Sutton Coldfield, England, assignors to Dunlop Rubber Company Limited, a British corporation No Drawing. Application February 20, 1931, Serial No. 517,299. In Great Britain March 31, 1930

21 Claims. (Cl. 106—23)

This invention comprises improvements in or relating to the manufacture of goods of rubber or similar material and is particularly concerned with the production of homogeneous compositions of rubber or similar material from aqueous dispersions thereof of the kinds hereinafter specified, the present application being a continuation-in-part of our co-pending application Serial No. 406,154, filed November 9, 1929.

An object of the invention is to effect by the addition of one or more of certain hereinafter specified compounding ingredients under hereinafter defined conditions the coagulation of the aqueous dispersions of rubber or similar material into crumb-like or powder-like compositions which when dried have the following particularly useful properties.

Another object of the present invention is to produce homogeneous, crumb-like or powder-like compositions of rubber or similar material from aqueous dispersions thereof of the kinds hereinafter specified and further to produce such compositions in admixture with disintegrated organic materials, e. g. ground rubbered cotton waste, ground tyre carcasses, ground vulcanized rubber waste, cotton or other fibres, disintegrated cork, wood flour, wood pulp, husk meal, disintegrated rawhide, leather dust, disintegrated gutta-percha or asphaltum.

It is found, for example, that the application of pressure to these crumb-like or powder-like compositions effects their consolidation and that for mixtures of normal type, e. g. for motor treads, etc., the mere operation of warming between rollers in the normal manner can impart the necessary consistency of plasticity for direct calendaring profiling and extruding.

It is also found that where these crumb-like or powder-like compositions contain very high proportions of compounding ingredients these compositions may be employed in the manner of mother stocks and can be incorporated with rubber on a mill in known manner or may themselves be directly consolidated to form leather-like compositions. The consolidated compositions may be made to contain homogeneously dispersed throughout their mass higher proportions of compounding ingredients such as gas black than can be introduced by compounding rubber in known manner on the mill.

According to the invention the crumb-like or powder-like character is obtained by first adding to the aqueous dispersions of rubber or similar material certain hereinafter specified substances which are commonly used as compounding ingredients, but which when added in the usual manner in sufficient amounts to latex, cause coagulation; their coagulative effect is, however, arrested at this stage by the presence of suitable stabilizing substances until the thorough mixing of the latex and compounding ingredients has been effected.

The protective influence of the stabilizing agents is then lowered by the addition of the hereinafter specified compounding ingredients referred to for the effecting of the agglomeration. These substances are added in sufficient quantity to induce agglomeration or incipient coagulation, but insufficient to lead to the formation of a coherent coagulum.

The invention comprises stirring the aqueous dispersions hereinafter specified during the operation of compounding in the presence of a protective colloid or protective colloids of the types herein mentioned, and performing the compounding operation under such conditions that whereas, the ratio of the protective colloids to the compounding ingredients throughout the initial stages of compounding does not allow any substantial coagulation to take place, a critical ratio is subsequently attained such that coagulation is made to occur in the form of crumb-like or powder-like compositions.

Examples of compounding ingredients suitable for introduction into the aqueous dispersions in the first stage of the process are gas black, clay, various grades of amorphous silica, whiting.

Examples of compounding ingredients which induce the agglomeration at the second stage are gas black, amorphous silica and basic oxides such as zinc oxide, lime and magnesia.

If a composition containing fibrous fillers is desired, the compounded dispersions of rubber or the like thus obtained may be then admixed with disintegrated organic filling materials, preferably properly wetted as for instance with an aqueous solution of ammonium oleate. Thereafter the mixtures produced in this manner are coagulated by the addition, while stirring, of the compounding ingredients hereinbefore mentioned as belonging to the second stage of the process.

The compounding ingredients to be added in the first stage of the process are first dispersed in water with the aid of predetermined, suitably adjusted quantities of protective colloids and when these aqueous dispersions of compounding ingredients are added to the aqueous dispersions of rubber or similar material the protective colloids prevent in known manner the coagulation of these dispersions of rubber or similar material.

The compounded dispersions thus obtained may be thereafter made to wet comparatively coarse particles of disintegrated organic materials such as ground rubber waste, cotton fibre, wood flour, leather dust or disintegrated gutta-percha. By comparatively coarse particles are meant particles which have for their greatest linear dimensions a size ranging for instance from 0.1 m. m. to 5 m. m. These admixtures are then converted in a second stage into crumb-like compositions by the addition of, for example, zinc oxide or lime and are subsequently dried. When coagulation is afterwards effected by the addition while stirring of the compounding ingredients hereinbefore specified as belonging to the second stage, the formation of the usual type of continuous coherent mass does not occur; a discontinuous agglomeration of flocculent or of loose crumb-like character is obtained instead.

This stage of the process may be effected in two ways. The protective influence of the stabilizing agents used in admixing the compounding ingredients added in the first stage of the process may be lowered by the addition of substances, viz, those classed in the second stage of the process which are themselves compounding ingredients, but which because of their particular way of dispersion, had they been added to the aqueous dispersions of rubber or the like material which had not been treated with the compounding ingredients specified as belonging to the first stage of the process, would not effect coagulation. It is only because these compounding ingredients classed in the second stage of the process are added to an already compounded latex, compounded in the manner hereinbefore described that the agglomeration is effected probably due to the instability produced by their influence on the protective colloids already present.

In certain cases, however, the addition of one or more of the compounding ingredients classed in the second stage of the process may bring about agglomeration due to having effected a prior experimental adjustment in the ratio of compounding ingredients to protective colloids so that the final ratio of compounding ingredients to the protective colloids, although sufficient to disperse the compounding ingredients properly is insufficient to prevent the particular type of coagulation desired in the compounded latex.

This second manner of carrying the invention into effect is particularly applicable where the compounding ingredients used to effect the agglomeration are of the same nature as those added to the aqueous dispersion of rubber or the like material in the first place.

The protective colloids used may be of such a nature as to lead to a softening effect on the dry compounded rubber thereby, if desired, permitting it subsequently to be extruded or calendared without previous mastication or substantial mastication. Also by suitable choice of protective colloids employed, no detrimental effect is observed in the mechanical properties of the vulcanized rubber. The agglomeration of the aqueous dispersion of rubber or the like material into the form of crumb or powder allows the compounded rubber produced at this stage to be washed, if desired, for the removal of soluble substances therefrom and to be easily dried and to be subsequently easily manipulated in manufacturing processes, e. g. in molding operations. The undried material may be shaped, for instance, by spreading, pressure, moulding. The dried mass can be plasticized on an ordinary mixing mill, profiled or extruded, moulded and vulcanized.

The advantages obtained according to the present invention are that mixings can be produced in which the particles of disintegrated organic materials are present in a matrix consisting of a comparatively small quantity, for instance, about 20 per cent on the total mixture of high quality reinforced mixing which acts as a strong binding agent for them in the finished product.

Mixings can also be produced containing large proportions of disintegrated organic materials for instance about 70 per cent on the total mixing such as cotton fibre, ground vulcanized rubber waste, wood flour, leather dust, which are suitable for moulding, profiling and extruding operations which could not be obtained by compounding in the normal manner.

The dispersions comprise by way of example, those consisting of or containing rubber, gutta-percha, balata or similar vegetable resins occurring naturally or artificially obtained and in vulcanized or unvulcanized condition. Aqueous dispersions of coagulated rubber, synthetic rubber, vulcanized rubber, waste or reclaim, may also be employed, if desired, as alternatives or admixtures. These materials are hereinafter designated as rubber material.

Any of the aforesaid dispersions may contain the usual known compounding ingredients and/or may be in concentrated form.

It has been found that ammonium compounds of organic acids such as ammonium oleate, ammonium stearate and ammonium resinate, are examples of protective colloids which fulfill the necessary requirements. They are good dispersing agents. They allow the formation of discontinuous crumb-like masses under the described conditions. They decompose on drying, leaving the corresponding organic acids in the crumb. These acids can exert sufficient softening effect on the rubber to enable extrusion without previous substantial mastication, whilst during subsequent vulcanization the combination of the resulting acids with the zinc oxide present provides any substantial softening effect by these acids in the vulcanized rubber.

Compounds of the higher fatty acids with the alkali metals can also be used in place of the corresponding ammonium compounds; in this case, however, the alkali metal naturally remains there or may be removed by washing with water.

Concentrates such as are obtained in Patent 1,846,164, Feb. 23, 1932, in which may be incorporated any one or more of the usual compounding ingredients may also be used.

The following are given by way of example as to how the process can be effected—

1. A latex mixing having the following composition—

| | Parts by weight |
|---|---|
| Rubber | 61 |
| Sulphur | 3.5 |
| Zinc oxide | 5.0 |
| Gas black | 27.0 |
| Oleic acid | 3.5 | is prepared in the following manner:

27 parts of gas black and 3.5 parts of sulphur are stirred into 75 parts of water containing 3.5 parts of oleic acid in solution as ammonium oleate and the mixture is passed twice through a colloid mill. The dispersion thus obtained is added slowly to sufficient latex concentrated to give the desired 61 parts of rubber and the mixture is stirred mechanically for a few minutes, for example, by means of a rotating wire mesh paddle or by agitation in a mechanical mixing hopper such as is commonly used in the preparation of rubber solutions or doughs. The five parts of zinc oxide, previously dispersed in 10 parts of water containing 0.05 part of casein and 0.05 part of glue, are then added and the stirring continued. After a few minutes considerable thickening takes place leading to the formation of a viscous mass which soon changes into a fine crumb. The crumb can either be washed with water or placed immediately on racks to dry, or may be passed through rollers or placed in presses to squeeze out the bulk of the water. The dry mass when heated, for example, by short treatment on warming mills, is ready for extrusion, calendaring or other treatment.

It should be noted that in this example although agglomeration and subsequent crumb formation do not take place until after the zinc oxide dispersion has been added, mechanical agitation of the type indicated of such a dispersion with latex in the absence of gas black does not cause coagulation or even thickening of the latex. It is assumed that the protective action of the ammonium oleate is reduced so that it becomes just insufficient to protect the latex from the coagulating effect of the gas black. If the proportion of the oleic acid given in the example is decreased to any appreciable extent, e. g., to 2.5 parts, thickening and ultimate flocculation tend to occur in an uncontrollable manner even without the addition of zinc oxide. The advantage of causing this change at will is that it permits thorough mixing of the latex and gas black dispersion.

2. The following is an example of the production of a latex mixing which when dry is obtained in fine powder form.

A mixing consisting of—

| | Parts by weight |
|---|---|
| Rubber | 20.0 |
| Sulphur | 1.0 |
| Gas black | 30.0 |
| Zinc oxide | 4.0 |
| Oleic acid | 1.0 |
| Rosin | 3.0 | is made up in the following manner—

30 parts of gas black and 1 part of sulphur are mixed with 60 parts of water containing an ammoniacal solution of 3 parts of rosin and 1 part of oleic acid. The mixture is mechanically stirred for a short time and then added to sufficient latex concentrated to give 20 parts of rubber. After a few minutes stirring, 4 parts of zinc oxide dispersed as in the first example, are added and the stirring continued.

The mass soon changes to a fine crumb which when dry, yields a powdery substance capable of being passed through a 60 mesh sieve.

This material when passed through warm mixing mills immediately consolidates into a coherent sheet and, with or without vulcanization, yields a tough leather-like product.

Alternatively, by mixing this material in suitable proportion with rubber on a mixing mill it may be used as a rapid and convenient means of compounding gas black in the preparation of reinforced rubber mixings.

It is found that the homogeneous rubber compositions obtained according to this invention are suitable during the crumb-like or powdery stage for the manufacture, e. g., by molding, of a large variety of articles such as tiles and boot soles, while after the crumb-like or powder compositions have been consolidated by pressure, the material can be used for the manufacture of sheet for flooring, pram tyring and treads for tyres.

A cheap mix which can be rendered plastic on a mixing mill having the following composition—

| | Parts by weight |
|---|---|
| Rubber (in the form of concentrated latex obtained according to application Serial No. 727,530) | 10 |
| Sulphur | 5.0 |
| Gas black | 3.0 |
| Zinc oxide | 1.0 |
| Ground vulcanized rubber tyre carcass waste | 73.0 |
| Oleic acid | 1.0 |
| Mercaptobenzothiazole | 0.1 |
| Mineral rubber | 6.9 | is prepared in the following manner:

The gas black is dispersed together with the sulphur in an aqueous solution of the bulk of the oleic acid as ammonium oleate and the dispersion thus obtained is mixed with sufficient latex to give the desired proportion of rubber.

The ground rubber cotton waste and mineral rubber are first disintegrated to a granular condition and are then mixed with sufficient water containing the remainder of the oleic acid in ammoniacal solution to ensure their being properly wetted. This mixture is then added to the latex-gas black dispersion. After sufficient gentle agitation has been given to the mixture to obtain uniform distribution of the latex-gas black dispersion throughout the mass, it is coagulated by the addition of zinc oxide previously made into a paste with water. In the crumb-like compositions so formed the particles of the disintegrated organic materials are surrounded or coated by rubber-gas-black-sulphur compositions.

The crumb-like compositions obtained may be shaped as such or may be dried and moulded or plasticized on a mixing mill when they are ready for profiling, extruding or moulding.

What we claim is:

1. A process for the manufacture of homogeneous crumb-like or powder-like compositions of rubber material from aqueous dispersions thereof, which comprises introducing into said aqueous dispersion a water insoluble compounding ingredient without lessening the protective colloids sufficiently to cause coagulation, admixing the aforesaid compounded dispersion with disintegrated organic material and thereafter stirring into the mixture a water insoluble compounding ingredient in quantity just sufficient to render said dispersion unstable.

2. A process as claimed in claim 1 wherein the disintegrated organic material is ground fibrous materials.

3. A process as claimed in claim 1 wherein the disintegrated organic materials are wetted with an aqueous solution of ammonium oleate.

4. A process as claimed in claim 1 wherein the compounding ingredient added in the first stage of the process is dispersed in water with the aid of predetermined, suitably adjusted quantities of protective colloids.

5. A process as claimed in claim 1 wherein the disintegrated organic materials are used as comparatively coarse particles, having for their greatest linear dimensions, a size ranging from about 0.1 m.m. to 5 m.m.

6. A process as claimed in claim 1 wherein zinc oxide is used in the coagulating stage to convert the admixtures into crumb-like compositions.

7. A process as claimed in claim 1 wherein the disintegrated organic materials are present in large proportions as for instance about 70 per cent on the total mixing.

8. A process as claimed in claim 1 wherein the disintegrated organic materials are bound together by a comparatively small quantity of high quality reinforced mixing as for instance about 20 per cent on the total mixture.

9. A process as claimed in claim 1 wherein the disintegrated organic materials are disintegrated waste rubber materials.

10. A process as claimed in claim 1 wherein the compounding ingredients added in the first stage of the process are dispersed in water with the aid of ammonium oleate as a protective colloid.

11. A process as claimed in claim 1 wherein a basic compounding ingredient is used in the coagulating stage to convert the admixtures into crumb-like compositions.

12. A process of manufacturing homogeneous crumb-like compositions which comprise mixing rubber latex with an aqueous dispersion of sulphur and gas black with an oleate as a protective colloid, mixing a wetted disintegrated rubbered cotton waste and mineral rubber with said mixture, said waste and mineral rubber being wetted with an oleate, said mixture being stirred while said waste materials and mineral rubber are added, and adding a paste of zinc oxide and water to said mixture in quantity just sufficient to render said dispersion unstable.

13. A process of making crumb-like rubber compositions from an aqueous rubber dispersion which comprises mixing with the dispersion a water insoluble filling material dispersed in a dispersing medium with protective colloids to form a stable uniform mixed dispersion with said latex and adding to said mixed dispersion relatively smaller quantities of additional water insoluble compounding filling material without sufficient protective colloids for a stable dispersion to the point where an unstable mixed dispersion is formed whereby the solids will agglomerate or precipitate into crumb-like material.

14. A process of making crumb-like rubber compositions from an aqueous rubber dispersion which comprises mixing with the dispersion water insoluble filling ingredients dispersed in a dispersion medium while maintaining in said dispersion medium sufficient protective colloids to prevent coagulation and adding additional water insoluble filling ingredients to said mixed dispersion while decreasing the proportion of protective colloids below that required to maintain the resulting mixture as a stable dispersion and terminating said decrease in the proportion of protective colloids immediately upon passing below the critical limit required for a stable dispersion whereby the solids will agglomerate or precipitate into crumb-like material.

15. A process of making crumb-like rubber compositions from latex which comprises mixing with latex water insoluble filling ingredients dispersed in a dispersion medium while maintaining in said dispersion medium sufficient protective colloids to prevent coagulation and adding additional water insoluble filling ingredients to said mixed dispersions while decreasing the proportion of protective colloids to such an extent as to permit the agglomeration, but not sufficiently to lead to the formation of a coherent coagulate whereby the solids will agglomerate or precipitate into crumb-like material.

16. The process of claim 13 in which the water insoluble ingredients added during the decreasing of the proportion of protective colloids are of the same nature as those previously added.

17. The process of claim 13 in which the protective colloid has a softening effect on the dried compounded rubber material.

18. The process of claim 13 in which the protective colloid is an ammonium salt of an organic fatty acid.

19. The process of claim 13 in which the protective colloid is ammonium oleate.

20. The process of claim 13 in which the protective colloid is an alkali salt of a higher fatty acid.

21. A process of forming crumb-like rubber compositions from latex which comprises dispersing about 27 parts of gas black and 3½ parts of sulphur in 75 parts of water containing 3½ parts of oleate acid as ammonium oleate, adding the resulting dispersion to a concentrated latex comprising approximately 60% of rubber, mixing said dispersions and adding to said mixed dispersions 5½ parts of casein and 5½ parts of glue and 5 parts of zinc oxide dispersed in 10 parts of water whereby the solids will agglomerate or precipitate into crumb-like material.

EDWARD ARTHUR MURPHY.
DOUGLAS FRANK TWISS.